(12) United States Patent
Callenryd et al.

(10) Patent No.: US 8,255,990 B2
(45) Date of Patent: Aug. 28, 2012

(54) IDENTIFICATION AND COMPUTER LOGIN OF AN OPERATOR OF A VEHICLE

(75) Inventors: Fredrik Callenryd, Storvreta (SE); Fredrik Palmqvist, Knivsta (SE); Mathias Bjorkman, Tullinge (SE)

(73) Assignee: Scania CV AB (Publ) (SE)

( * ) Notice: Subject to any disclaimer, the term of this patent is extended or adjusted under 35 U.S.C. 154(b) by 925 days.

(21) Appl. No.: 12/092,799

(22) PCT Filed: Sep. 12, 2006

(86) PCT No.: PCT/SE2006/050324
§ 371 (c)(1),
(2), (4) Date: Jun. 3, 2008

(87) PCT Pub. No.: WO2007/058607
PCT Pub. Date: May 24, 2007

(65) Prior Publication Data
US 2008/0244735 A1    Oct. 2, 2008

(30) Foreign Application Priority Data
Nov. 18, 2005    (SE) ...................................... 0502581

(51) Int. Cl.
*G06F 21/00* (2006.01)
(52) U.S. Cl. ......................................................... 726/20
(58) Field of Classification Search .................... None
See application file for complete search history.

(56) References Cited

U.S. PATENT DOCUMENTS

| | | | |
|---|---|---|---|
| 4,563,003 A | 1/1986 | Bugallo et al. | |
| 4,609,189 A | 9/1986 | Brasher | |
| 4,644,368 A | 2/1987 | Mutz | |
| 6,108,591 A * | 8/2000 | Segal et al. | 701/1 |
| 6,198,996 B1 * | 3/2001 | Berstis | 701/36 |
| 6,526,341 B1 * | 2/2003 | Bird et al. | 701/35 |
| 6,606,543 B1 * | 8/2003 | Sproule et al. | 701/1 |
| 6,895,316 B2 * | 5/2005 | Chen et al. | 701/36 |

(Continued)

FOREIGN PATENT DOCUMENTS

DE    43 21 642 A1    1/1995

(Continued)

OTHER PUBLICATIONS

Supplementary European Search Report for European Patent Application No. EP 06 78 4237 dated Oct. 29, 2010.

(Continued)

*Primary Examiner* — David Pearson
(74) *Attorney, Agent, or Firm* — Ostrolenk Faber LLP (57) ABSTRACT

A method for identifying and performing a vehicle operator computer login to a vehicle computer provided in a vehicle. A device is arranged to request and receive vehicle operator data stored on a data carrier provided for a tachograph comprising a reader for reading the data carrier. The device controls communication of vehicle operator related data to the vehicle computer, wherein the device is arranged to initiate a vehicle operator login procedure of the vehicle computer, in dependence on the data carrier inserted in the tachograph. The invention is also related to a vehicle arrangement, a computer program and a computer program product. The invention solves the problem of providing identification and login of an operator of a vehicle to the vehicle computer in a simplified and secure way. The invention also enables shortened start up/stop times of a vehicle by reducing systems login/logoff time for an operator.

21 Claims, 3 Drawing Sheets

U.S. PATENT DOCUMENTS

| | | | |
|---|---|---|---|
| 7,069,439 B1 * | 6/2006 | Chen et al. | 713/172 |
| 7,117,075 B1 * | 10/2006 | Larschan et al. | 701/35 |
| 7,379,541 B2 * | 5/2008 | Iggulden et al. | 379/102.03 |
| 2001/0045451 A1 | 11/2001 | Tan et al. | |
| 2004/0019416 A1 | 1/2004 | Chen et al. | |
| 2004/0166942 A1 * | 8/2004 | Muir | 463/43 |
| 2004/0217176 A1 * | 11/2004 | Wahler | 235/480 |
| 2004/0243285 A1 * | 12/2004 | Gounder | 701/1 |
| 2006/0041761 A1 * | 2/2006 | Neumann et al. | 713/189 |
| 2006/0287821 A1 * | 12/2006 | Lin | 701/213 |

FOREIGN PATENT DOCUMENTS

| | | | |
|---|---|---|---|
| DE | 197 50 771 A1 | | 5/1999 |
| EP | 0 624 856 A2 | | 11/1994 |
| EP | 0 762 339 A2 | | 3/1997 |
| EP | 0 774 736 A2 | | 5/1997 |
| EP | 0 917 110 A2 | | 5/1999 |
| GB | 2 336 221 | | 10/1999 |
| GB | 2426363 A | * | 11/2006 |
| WO | WO 00/67415 | | 11/2000 |
| WO | WO 2005/076584 | | 8/2005 |

OTHER PUBLICATIONS

International Search Report dated Dec. 12, 2006 issued in corresponding PCT Application No. PCT/SE2006/050324.

* cited by examiner

IDENTIFICATION AND COMPUTER LOGIN OF AN OPERATOR OF A VEHICLE

CROSS REFERENCE TO RELATED APPLICATION

The present application is a 35 U.S.C. §§371 national phase conversion of PCT/SE2006/050324, filed 12 Sep. 2006, which claims priority of Swedish Application No. 0502581-2, filed 18 Nov. 2005. The PCT International Application was published in the English language.

TECHNICAL FIELD OF THE INVENTION

The present invention generally relates to the field of vehicles and more particularly to a method, a vehicle arrangement, and a computer program product for identification and computer login of an operator of a vehicle.

DESCRIPTION OF RELATED ART

In the field of vehicles and especially the field of transport vehicles, there is an ever increasing development to provide vehicles with a variety of electronic systems. A particular example of such systems is a system providing driver logs, typically provided as a digital tachograph, and a vehicle computer system providing support functions, such as providing functions and information related to a particular vehicle operator. In many cases, the electronic systems require the identity of a particular vehicle operator, such that operating characteristics can be related to the identified vehicle operator, as will be the case as regards electronic driver logs for instance, which in the past typically were generated manually by the vehicle operator i.e. driver.

Typically, in order to identify vehicle operators, a unique identification code and password is therefore assigned to each vehicle operator. The identification code and password must be manually entered into the electronic systems onboard the vehicle prior to operation thereof. This of course is time consuming and may therefore be irritating to the vehicle operator, as well as providing unnecessary costs for the vehicle owner having to pay for vehicle stand-still time.

Moreover, typically the electronic systems do not communicate with each other, thus requiring a separate login and logoff procedure for each system, even though such communicating systems exist. An example of such a system is described in U.S. Pat. No. 6,108,591, wherein a vehicle operator is pre-assigned a unique identification code which is used to request a communication system login or logoff from the validation system. A database of all vehicle operator identification codes is stored at a central station. The identification code is, by user manipulation, transmitted from the vehicle to the central station when a login or logoff is requested. If the identification code of the requesting operator is found in the database, any electronic system requiring the vehicle operator's identification is notified of the login or logoff event and of the identification of the vehicle operator requesting the event.

Nevertheless, there are problems related to the procedures of logging onto and off from electronic systems provided in a vehicle still remaining, as for instance security and connection problems related to usage of a centrally based system as the above described. Beside such problems further problems such as forgetting passwords and forgetting to logoff from the systems often exist in reality, providing unnecessary predicaments for a vehicle operator wanting to focus on his primary tasks such as driving the vehicle.

There is thus a need for a way to enable reduction of vehicle operator system login and logoff time as well as for providing more user-friendly systems that also provide an adequate level of security for the vehicle operator systems login.

SUMMARY OF THE INVENTION

One object of the present invention is to solve the problem of providing identification and computer login of an operator of a vehicle in a simplified yet secure way. Another object of the present invention is to solve the problem of how to reduce the start up/stop time of a vehicle, which is dependent on the numbers of actions required by the vehicle operator for system logins/logoffs.

According to one aspect of the present invention, these objects are achieved by a method for identifying and logging on a vehicle operator to a computer system provided in a vehicle wherein a tachograph data carrier, having vehicle operator data stored thereon, is inserted by the operator or driver of the vehicle into a tachograph means. The tachograph means comprises reading means provided for receiving and reading such tachograph data carriers having vehicle operator data stored thereon for identifying an operator of the vehicle computer system. The data carrier is read and vehicle operator data is thus received in the tachograph means and transmitted to a device for performing a vehicle operator login to the vehicle computer. The computer login is thus accomplished in dependence of the data carrier being inserted into said tachograph means.

Upon insertion of the tachograph data carrier or driver card into the tachograph means a verification procedure is typically performed automatically therein for verifying and validating at least that the inserted card is a driver card intended for this kind of tachograph. Preferably also the operator is verified through reading the card data, when a valid card type is inserted, for performing a tachograph logon only for validated vehicle operators. The workings of such digital tachographs including the tachograph logon procedure is however well known in the art and is therefore not further described herein. It is presumed that the data carriers or driver cards mentioned herein are intended for and readable by a digital tachograph since this a prerequisite for a vehicle operator computer login being possible at all.

In this way, no separate login or logoff is required for each electronic system, i.e. at least the computer and the tachograph system of the vehicle. The vehicle operator does not have to enter ID and password, or insert more than one data carrier having vehicle operator data stored thereon to be able to log onto the vehicle computer and the tachograph, since login and logoff is provided easily and secure by means of inserting or removing his/her data carrier, typically his/her driver card into or from the tachograph only.

According to a second aspect of the present invention, said vehicle operator data is requested by the device for identifying an operator of a vehicle computer.

According to a third aspect of the present invention, said vehicle operator data is requested via the vehicle computer.

Moreover, in this way, the vehicle operator is logged onto both the vehicle computer and the tachograph by means of inserting only his/her driver card into the tachograph. This provides a user friendly login process saving effort and time for the vehicle operator, as no separate login, for example using ID and password or ID and another access card is necessary. Thereby, only one login procedure in total is required for validating the vehicle operator and starting up both the vehicle tachograph and computer.

According to a fourth aspect of the present invention, an indication is transmitted from the tachograph to the device (or vehicle computer) when a data carrier, preferably a driver card is inserted. According to a fifth aspect of the present invention, the vehicle operator data is transmitted after an indication that the data carrier is inserted has been transmitted and received by the device.

In this way, the tachograph means indicates when a data carrier has been inserted. Thus, it is not necessary to request transmission of vehicle operator data all the time, which may decrease unnecessary communication.

According to a sixth aspect of the present invention, said vehicle operator data is requested periodically or continuously.

According to a seventh aspect of the present invention, the method further comprises the step of:
performing a vehicle operator logoff, from the vehicle computer, in dependence of the data carrier being removed from the tachograph means.

In this way, it is easy for the vehicle operator, preferably the driver to both remember to logoff and to accomplish the logoff.

According to another aspect of the present invention, this object is also achieved by a vehicle arrangement for identifying and performing a vehicle operator computer login. The arrangement for this purpose comprises a vehicle computer connected to a tachograph means comprising reading means for reading tachograph data carriers. The arrangement further comprises a device adapted to receive vehicle operator data stored on a data carrier provided for the tachograph means. The device controls communication of said vehicle operator related data to the vehicle computer and performs a vehicle operator login to the vehicle computer in dependence of the data carrier being inserted in the tachograph means. The device could be provided as part of the vehicle computer, and implemented as software. In this case, the tachograph means is directly connected to the vehicle computer. Alternatively, said device could be provided as part of a separate ECU (Electronic Control Unit) provided between, preferably interconnecting, the tachograph means and the vehicle computer for controlling the data communication between the tachograph and vehicle PC. The device could in this case also be implemented as software of this ECU. Preferably, the device could be provided as part of the second printed circuit board or so called SMIT card of the Swedish patent SE524 222, which is hereby incorporated by reference.

Typically, the device is connected to the tachograph means by means of a communication link including a bus, such as a CAN-bus (Controller Area Network) or LIN-bus (Local Interconnect Network). In this way, already existing communication structures, typically present in a vehicle, for instance including the CAN or LIN, could be employed.

Alternatively, the device is connected to the tachograph means by means of a communication link including a cable connection such as a RS 232 cable, an optical cable or USB cable.

Typically, the device is arranged to receive an indication that a data carrier has been inserted into the tachograph means, preferably to receive and evaluate a signal from the tachograph means indicating that a data carrier has been inserted.

Preferably, said signal comprises a bit having a particular value, such as a flag, indicating that a data carrier has been inserted.

Alternatively, the device is arranged to request data from the tachograph means periodically or continuously.

According to another aspect of the present invention, the object is also achieved by a computer program for identifying and executing a vehicle operator computer login to a vehicle computer provided in a vehicle. The program to this end comprises computer program code to make a computer perform, when the computer program is loaded and run therein:
at least receiving vehicle operator data from a tachograph means comprising reading means for reading a therein inserted data carrier comprising vehicle operator data,
transmitting at least part of the vehicle operator data to the vehicle computer for identifying the vehicle operator, and
executing a vehicle operator login to the vehicle computer in dependence of that data.

According to a further aspect of the invention the computer program further comprises computer program code for executing a vehicle operator logoff from the vehicle computer in dependence of data indicating that a data carrier is removed from the tachograph means.

One aspect of the invention comprises that the computer program has computer program code for requesting said vehicle operator data from the tachograph means.

Yet a further aspect of the invention relates to a computer readable medium, having a computer program for identifying and executing a vehicle operator computer login to a vehicle computer recorded thereon.

BRIEF DESCRIPTION OF THE DRAWINGS

The present invention will now be described in more detail in relation to the enclosed drawings, in which.

DETAILED DESCRIPTION OF EMBODIMENTS

The present invention is directed towards any application in which electronic systems provided in a vehicle, for instance a transport vehicle such as a hauler- or carrier truck or other type of commercial truck, a bus, or any other type of transport vehicle, require vehicle operator identification. There are a number of situations where this type of identification might be necessary. One such situation is login or logoff of a vehicle operator onto or from a vehicle computer and a digital tachograph. In the exemplary embodiments described, the vehicle is a commercial trucking vehicle having a vehicle computer mounted in a driver cab of the vehicle. Typically, the vehicle computer (computer system) is capable of interaction with the vehicle operator via a vehicle operator interface, for instance a touch screen including a virtual keyboard implemented therein provided in the vehicle computer. The invention is not limited to this, however, but can be embodied in many other ways. Also the vehicle computer can be mounted at any suitable location of the vehicle and is not limited to being mounted in the driver cab. Moreover, the vehicle computer may include all functions necessary to perform the tasks required, but also other configurations including capability to communicate wirelessly through radio waves etc, with a central computer system assisting the onboard vehicle computer, for instance with a central server or communication centre including some of the required functionality could be provided even if not disclosed herein without departing from the invention as claimed. Thus, the term "vehicle computer" is to be interpreted broadly including also a computer system comprising part of the vehicle computer related features physically provided elsewhere than in the vehicle computer box itself.

The tachograph mentioned preferably is an off the shelf commercially available digital vehicle tachograph and is therefore not further described herein. Special adaptations thereof could be envisaged as regards its software and, for example, the number of tachograph card readers it comprises.

Figure 1A:
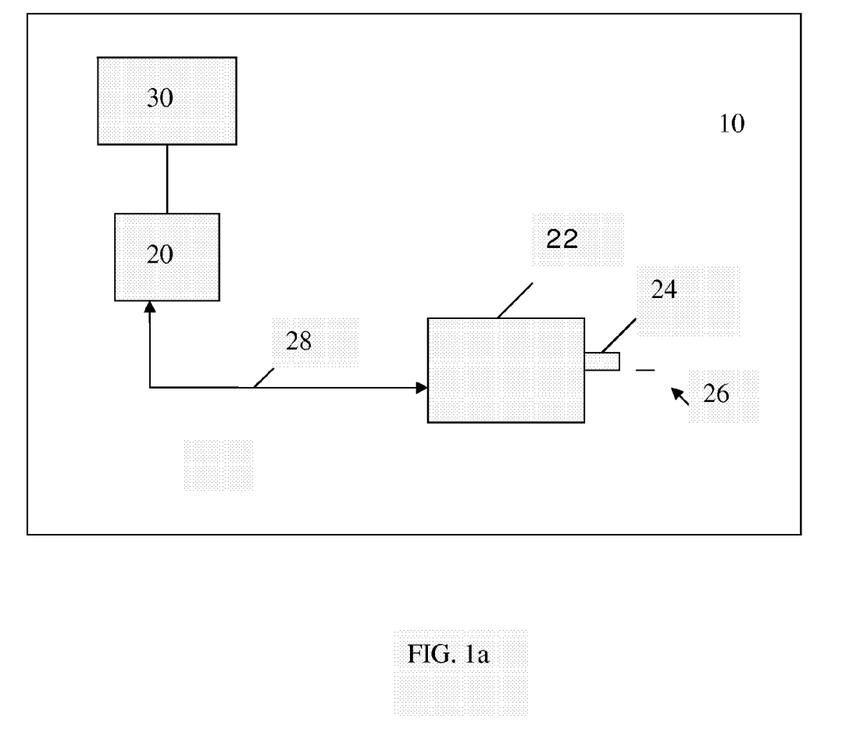
FIGS. 1a and 1b, respectively show a block schematic of components within a vehicle that are relevant for the present invention.

FIG. 1a shows a block schematic of a vehicle 10 comprising a device 20 for identification and computer login of a vehicle operator, for instance a vehicle driver (not shown), and a vehicle computer 30. The components required for vehicle operator identification and computer login are schematically illustrated in FIG. 1a. In the exemplary embodiment, the device 20 for identification and computer login of a vehicle operator is arranged to communicate with a digital vehicle tachograph 22 that comprises a card reader 24 typically provided with a faceplate having a slot (not shown) for receiving a data carrier 26 having vehicle operator data stored thereon. Typically the card reader 24 is provided incorporated in the tachograph 22. The card reader 24 is typically mounted in the dashboard (not shown) of the vehicle 10 with the faceplate easily viewable and accessible to the vehicle driver. The device 20 is also arranged to communicate with the vehicle computer 30 for transmission of vehicle operator related data such as driver ID and more.

The device 20 is connected to a communication link 28 provided for communication between the device 20 and the tachograph 22. The communication can preferably be provided by means of a serial bus, for instance a so-called CAN bus or LIN bus, or by a physical link including, but not limited to, a cable connection such as an RS 232 cable, an optical cable or USB cable.

The device 20 may also use (and include) conventional communication means such as buses, protocols etc known per se, typically also provided for other types of communication. The communication between the device 20 and the vehicle computer 30 is only schematically shown, but could incorporate any suitable kind of data communication incorporating the above described, and could even comprise alternate solutions for wireless data communication.

Preferably, the data carrier 26 is a driver card provided for a digital vehicle tachograph (known per se), but any type of data carrier suitable for storing vehicle operator data and suitable for the tachograph 22 and card reader 24 could be provided instead. Typically, the vehicle operator data includes name of driver, personal identification code (such as driver ID), and time information, such as indication time when the data carrier 26 was inserted into card reader 24.

Figure 1B:
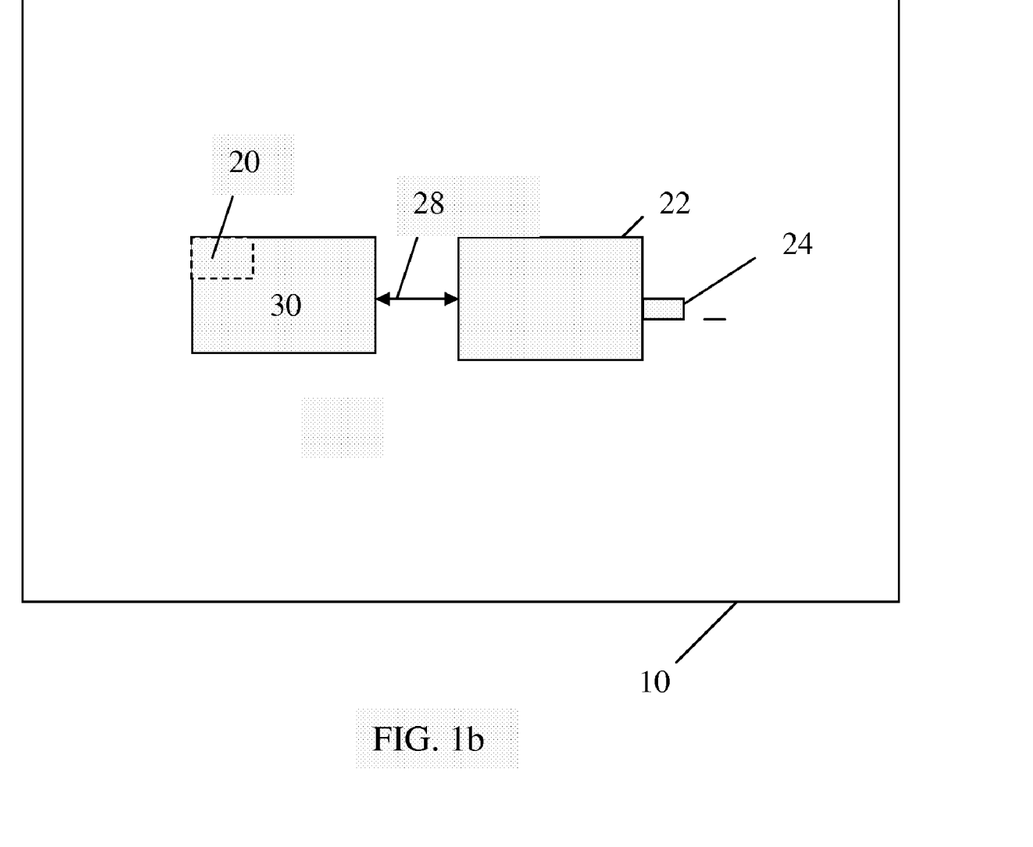

FIG. 1a shows an embodiment of the present invention, in which the device 20 is provided as a separate unit ("control unit") between the tachograph means 22 and the vehicle computer 30. Another embodiment of the present invention in which the device 20 is implemented in the vehicle computer 30 is shown in FIG. 1b.

The device 20 is, in an alternative FIG. 1a embodiment, incorporated in the so-called SMIT card of Swedish patent SE524 222 by the same applicant. In an alternate FIG. 1b solution, the SMIT card is arranged incorporated in the computer.

Now, reference is made to FIG. 1a. To load data, the vehicle driver inserts the data carrier 26 into the card reader 24 of the tachograph 22 and the card reader 24, therefor adapted, downloads or reads operator data from the card, typically according to a sequence initiated through program code or the like. The driver can here be instructed to insert the card through a message, either displayed visually or audibly, this constituting an optional solution since the driver card always will be inserted by the driver before driving the vehicle anyway. Preferably, some or all of the operator data read or downloaded from the card are transmitted directly via the tachograph 22 to the device 20 for performing operator identification and subsequent computer login.

Alternatively, the device 20 requests the vehicle operator data, which could be provided in any of the following described alternative ways, from the tachograph 22.

As one such alternative, an indication is transmitted from the tachograph 22 to the device 20 when a data carrier 26, preferably a driver card, is inserted wherein the device 20 requests the tachograph 22 to transmit vehicle operator data, such as driver ID, read from the card to the device 20 upon receiving such an indication.

Preferably, this indication is provided in the form of a bit having a particular value, such as a flag, indicating a data carrier being inserted in or removed from the tachograph. This is not further described since it is well known to provide an indication in the form of a flag for a computer system.

In another alternative no indication of an inserted card is sent to the device 20. The device 20 instead requests operator data from the tachograph 22 periodically, for example through sending a set of query data separated by a time space, for instance a few seconds, or the tachograph is requested continuously by the device 20.

When the device 20 has received the vehicle operator related data, such as driver ID at least, according to any of the above described alternative procedures, this data is transmitted from the device 20 to the vehicle computer 30 for initiating a vehicle operator login procedure.

One embodiment of computer login via the data from the device 20 comprises the vehicle PC or computer accepting and logging in all operators when receiving the operator data from the device 20. It is here only checked if an account for the particular driver ID transmitted via the device 20 already exists for a driver and if it is found existing the corresponding PC account is activated, for example comprising a personal previously stored PC configuration and further operator data as previously entered by the concerned vehicle operator, the same thus being logged in to the computer 30. Here preferably only the driver ID need be transmitted and compared for correspondence in a PC memory space, for example stored therein in a look-up table connecting a particular driver-ID with a previously created and stored driver PC account.

If a corresponding driver ID i.e. PC account is found not existing in storage, i.e. in case of the first logon attempt to a vehicle PC, a new account is automatically created, i.e. created through for this purpose specially adapted software instructions known in the art per se, and stored for the vehicle operator together with the driver ID, for example in a look-up table having a reference or connection to the corresponding driver PC account. Here the device 20, for example, is further requested by the PC to also transmit any other available operator data from the driver card, such as driver name. The driver can also enter and store such data in the personal PC account himself/herself as well as set and store a personal PC configuration therein according to measures well known in the art and therefore not further described.

In an alternative embodiment, the device 20 checks or compares vehicle operator data, such as at least driver ID against a vehicle PC 30, device 20, tachograph 22 or centrally stored list of valid or registered data carriers or driver cards, before transmitting the data to the vehicle computer for a computer login sequence. If upon comparison it is found that the card, i.e. card data is not registered as valid, no login is performed. Otherwise a login procedure according to any of the above described alternative procedures is performed.

A computer login procedure of the invention will be described in even more detail below.

The device 20 is preferably provided in the form of a processor with program memories comprising computer program code which performs method steps of the invention for accomplishing the computer login/logoff. It may also be provided in the form of pure computer program code, which may be provided on a record carrier, or by means of a server and downloaded from there to a vehicle or the server of the vehicle support centre. This embodiment of the present invention is shown in FIG. 1*b* operating in a similar manner as described in relation to FIG. 1*a*, but in which the tachograph 22 is directly connected to the vehicle computer 30, typically by means of a serial communication link 28, such as a RS 232 cable, an optical cable or USB cable. This embodiment will not be further described, since it is readily understood by following the description above and below, mainly related to the embodiment shown in FIG. 1*a*.

Although not being a preferred solution due to requiring further operator actions, it should be understood that within the scope of the present invention as claimed also lies the possibilities for a vehicle operator login and logoff procedure, that still is easy to perform, using at least a portion of already existing buttons and controls of the tachograph (and possibly also the vehicle computer). Any input unit(s) required are preferably provided in the form of a keyboard or a keypad (being virtual or not) as described, but also other types of inputs are contemplated, like for instance the use of voice inputs and voice recognition even though not further described herein. It should also be realised that the user input unit can alternatively be provided in a separate handheld device like for instance in a hand held computer like a personal digital assistant.

In the described embodiment, the vehicle computer 30 is a vehicle computer system known per se and based on a user-friendly operating system such as "Windows", "Linux", or the like, but all types of operating systems having different appearances could be provided instead.

Preferably, the appearance to the vehicle operator, i.e. to the driver, should be as understandable and user friendly as possible, bearing in mind the use of already existing displays and/or other user interfaces such as already existing key-boards etc to save cost and number of devices mounted in the driver cab.

Common for all alternative variations of the invention is that no separate login or logoff is required for each electronic system of the vehicle, that the vehicle operator does not have to enter ID and password, or insert more than one data carrier having driver data stored thereon to be able to log onto the vehicle computer through the tachograph, that login and logoff is provided easily and securely by means of inserting or removing the personal tachograph data carrier, typically the driver card into/from only one reading unit. Thus, preferably, the number of, if any, input devices such as key-boards etc should be minimized.

The invention will now be described shortly in relation to two different communication scenarios, a login and a logoff procedure, respectively.

Figure 2:
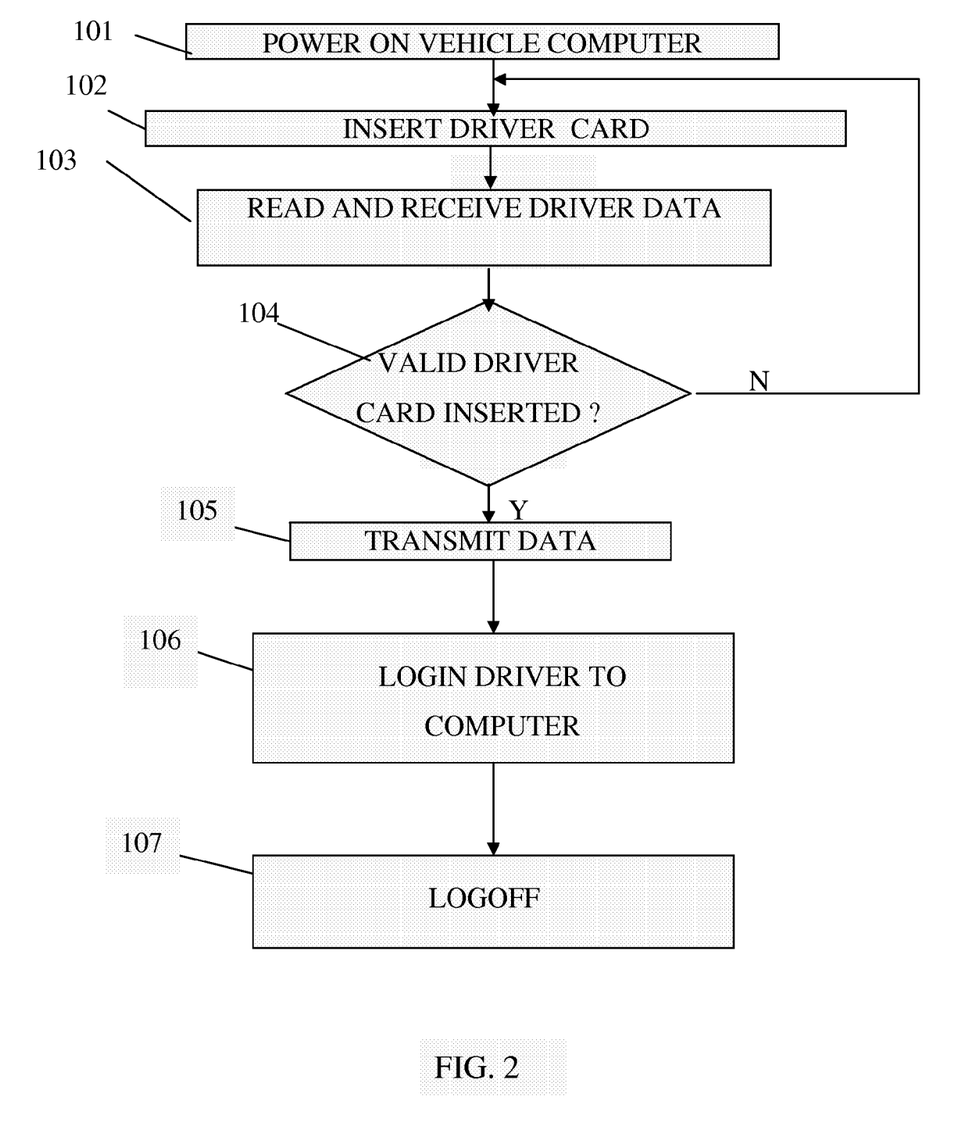
FIG. 2 shows a flow chart of a method according to the present invention provided in relation to a communication scenario related to login to and logoff from a vehicle computer, and FIG. 3 schematically shows a computer program product in the form of a CD comprising computer program code for performing method steps of the present invention.
Figure 3:
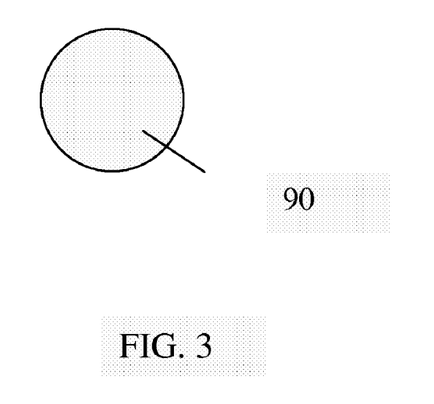

Now to FIG. 1*a* (FIG. 1*b*) is referred to as well as FIGS. 2 and 3. FIG. 2 shows a flow chart illustrating an embodiment of a procedure for login to a vehicle computer 30 (as well as logoff, step 107). As a start, power is applied or has been applied for example by means of manipulating a power on button of the vehicle computer 30, or turning on ignition, step 101. The vehicle operator then inserts his driver card 26 into the card reader 24 of the tachograph 22, or the vehicle computer 30 displays a user login prompt on a screen (not shown), instructing the vehicle operator to insert vehicle driver card into "tachograph" 22, step 102. Then the card reader 24 reads data from the data carrier, step 103.

The vehicle operator is then logged onto the vehicle computer 30, by means of the device 20 either directly receiving or requesting and receiving vehicle operator data and initiating a login procedure, step 105, 106 (including transmission of the vehicle operator related data) for identifying, and in certain circumstances also validating, the operator identity by the operator driver card 26 being inserted into the tachograph 22 card reader 24. The operator identification and login is preferably performed by means of the device 20 itself, or including assistance from both the vehicle computer 30 and the tachograph 22 by means of initiating the login procedure into the vehicle computer 30 including entering of ID and password etc.

In this way, a separate login by means of entering vehicle operator ID and password into the vehicle computer separately (in addition to inserting a driver card into the tachograph) is no longer necessary. The ID (or corresponding data) is transmitted to the vehicle computer 30 for the login by means of the device 20, step 105.

The inventive solution can be partly implemented by means of software, for instance embodied as a computer program product comprising computer program code for performing method steps of the invention. An example of a computer program product is illustrated in FIG. 3 showing a CD 90 comprising a computer program that can be loaded into a computer, for instance the vehicle computer 30 and/or the SMIT card microprocessor.

By means of the invention, it is not necessary for a system administrator to update the vehicle computer to include a new vehicle operator, but since each vehicle operator is unique and defined by his driver card being unique (having a unique code sequence or the like), this could be performed in the vehicle by the vehicle operator himself if only a (valid) driver card is inserted into the tachograph. Thus, vehicle computer administration is not necessary any more as regards updating vehicle operators. This is a great improvement compared to the prior art having many drawbacks with regard to administration of vehicle operator data.

The tachograph of the inventive solution is a state of the art model digital tachograph comprising at least one card reader and need therefore not be further described herein.

In an alternative embodiment of the invention (not shown) it could be possible to include means for multiple vehicle operators to log in (and logoff). Of course, then some measures have to be taken to be sure not to mix these operators and not to log off an earlier operator that should be logged in.

This could for instance be provided by means of a login key that has to be pressed to be able to login further vehicle operators. Thus, for example, an additional driver or co-driver and passengers with driver cards can log in after the vehicle has been started by pressing this login button and then insert his/her driver card into the other slot. Alternatively, a function that enables the first vehicle operator to remove his driver card without being logged off automatically is used. An example of such an alternative function or solution comprises that an already performed login to the vehicle computer according to above described measures and means is maintained even if the driver card is removed from the tachograph card reader after a first insertion therein. The system logout is here instead instigated and performed for example by the driver card being inserted in and/or removed from the slot a second time for an already logged in operator. Such alternative solutions for multiple operator logins/logoffs are, for example, implemented by hardware, software or a combination of both hardware and software.

After the vehicle operator (or all operators) has logged into the vehicle computer 30, the procedure continues, where the computer system displays information related to one or more of the logged in operators (not necessary, but optional). The displayed information may of course include further information related to these operators.

Typically, logoff, step 108 is performed by the vehicle operator removing the driver card 26 from the card reader or reading unit of the tachograph 22, thereby initiating logoff though a signal or flag of a certain value other than for login being sent to the vehicle computer 30 via the device 20. In this way, security as well as convenience for the operator is increased since the vehicle operator does not have to remember to logoff from the vehicle computer, but just to remove the driver card from the card reader 24, typically provided incorporated in the tachograph.

The invention claimed is:

1. A method for identification, login of a vehicle operator and of at least one additional vehicle operator to a computer system provided in a vehicle, and login of the vehicle operator and of the at least one additional vehicle operator to a tachograph of said vehicle comprising the steps of:
   inserting a tachograph data carrier having vehicle operator data of the vehicle operator stored thereon into said tachograph of said vehicle, said tachograph comprising a reader provided for receiving and reading tachograph data carriers having vehicle operator data stored thereon for identifying the vehicle operator,
   reading said data carrier,
   receiving said vehicle operator data in said tachograph,
   logging in the vehicle operator to said tachograph in dependence on said data carrier being inserted into said tachograph, said logging in of said vehicle operator to said tachograph being performed by said tachograph,
   transmitting said vehicle operator data to a device for performing a vehicle operator login to said vehicle computer in dependence on said data carrier being inserted into said tachograph, and
   after the vehicle has been started, logging in an additional vehicle operator to said tachograph and to said vehicle computer by pressing a login button and then inserting a tachograph data carrier of the additional vehicle operator into said tachograph.

2. The method according to claim 1, further comprising said device requesting said vehicle operator data.

3. The method according to claim 1, further comprising requesting said vehicle operator data via said vehicle computer system.

4. The method according to claim 1, further comprising transmitting an indication from said tachograph to said device when a data carrier is inserted.

5. The method according to claim 4, further comprising transmitting said vehicle operator data when said indication has been transmitted and received by said device.

6. The method according to claim 1, further comprising requesting said vehicle operator data periodically or continuously.

7. The method according to claim 4, further comprising removing said data carrier from said tachograph for performing a vehicle operator logoff from the vehicle computer.

8. A vehicle arrangement for identifying and performing a vehicle operator tachograph and computer login, comprising
   a vehicle computer,
   a tachograph connected to said computer and comprising a reader for reading tachograph data carriers, said tachograph being operable to perform a vehicle operator login to said tachograph in dependence on a data carrier of a vehicle operator being inserted in said tachograph,
   a device operable to receive vehicle operator data of said vehicle operator, stored on said data carrier of said vehicle operator provided for said tachograph, said device further being operable to control communication of said vehicle operator related data to said vehicle computer, said device further being operable to perform a vehicle operator login to the vehicle computer in dependence on said data carrier of said vehicle operator being inserted in said tachograph, and said device further being operable to perform an additional vehicle operator login to the tachograph and to the vehicle computer, after said vehicle has been started, in dependence on pressing a login button and then inserting a data carrier of said additional vehicle operator in said tachograph.

9. The vehicle arrangement according to claim 8, wherein said device is further operable to perform a vehicle operator logoff from the vehicle computer in dependence on said data carrier being removed from said tachograph.

10. The vehicle arrangement according to claim 8, wherein said device is connected to at least one of said tachograph and said vehicle computer.

11. The vehicle arrangement according to claim 8, wherein said device is part of said vehicle computer, and is implemented by software.

12. The vehicle arrangement according to claim 8, wherein said device is connected to said tachograph by a communication link including a bus.

13. The vehicle arrangement according to claim 8, wherein said device is connected to said tachograph by a communication link including a cable connection.

14. The vehicle arrangement according to claim 8, wherein said device is further operable to receive and evaluate an indication that a data carrier has been inserted into said tachograph.

15. The vehicle arrangement according to claim 14, wherein said device is further operable to receive and evaluate a signal from said tachograph indicating that a data carrier has been inserted.

16. The vehicle arrangement according to claim 15, wherein said signal comprises a bit having a particular value, indicating that a data carrier has been inserted.

17. The vehicle arrangement according claim 8, wherein said device is further operable to request said vehicle operator data from said tachograph periodically.

18. The vehicle arrangement according to claim 8, wherein said device is further operable to request said vehicle operator data from said tachograph continuously.

19. A non-transitory computer-readable medium encoded with a computer program for identifying a vehicle operator and executing a vehicle operator computer login to a vehicle computer provided in a vehicle, said program comprising:
   computer program code to cause a computer to perform the steps of, when said computer program is loaded and run therein:
   at least receiving vehicle operator data from a tachograph comprising a reader operable for reading a therein inserted data carrier comprising vehicle operator data,
   transmitting at least part of said vehicle operator data to the vehicle computer for identifying the vehicle operator, executing a vehicle operator login to said vehicle computer, by a device for executing said vehicle operator login to said vehicle computer, in dependence on said data, and after the vehicle has been started, logging in an additional vehicle operator to said tachograph and to said vehicle computer by a login button being pressed and then a data carrier of the additional vehicle operator being inserted into the reader, said tachograph being operable to perform a vehicle operator login to said tachograph in dependence on said data carrier being inserted in said tachograph.

20. The non-transitory computer-readable medium according to claim 19, wherein said computer program code further causes said computer to perform a step of executing a vehicle operator logoff from said vehicle computer in dependence on data indicating that said data carrier has been removed from said tachograph.

21. The non-transitory computer-readable medium according to claim 19, wherein said computer program code further causes said computer to perform a step of requesting said vehicle operator data from said tachograph.

* * * * *